(12) United States Patent
Shimizu et al.

(10) Patent No.: US 11,332,841 B2
(45) Date of Patent: May 17, 2022

(54) ELECTRODE HOLDER, AND METHOD FOR PRODUCING ELECTRODE FOR ALUMINUM ELECTROLYTIC CAPACITOR

(71) Applicant: NIPPON LIGHT METAL COMPANY, LTD., Tokyo (JP)

(72) Inventors: Yuta Shimizu, Shizuoka (JP); Masahiko Katano, Shizuoka (JP); Toshifumi Taira, Osaka (JP); Shinya Sone, Osaka (JP)

(73) Assignee: NIPPON LIGHT METAL COMPANY, LTD., Tokyo (JP)

( * ) Notice: Subject to any disclaimer, the term of this patent is extended or adjusted under 35 U.S.C. 154(b) by 212 days.

(21) Appl. No.: 16/483,406

(22) PCT Filed: Dec. 7, 2017

(86) PCT No.: PCT/JP2017/043999
§ 371 (c)(1),
(2) Date: Aug. 2, 2019

(87) PCT Pub. No.: WO2018/146931
PCT Pub. Date: Aug. 16, 2018

(65) Prior Publication Data
US 2020/0013555 A1    Jan. 9, 2020

(30) Foreign Application Priority Data
Feb. 10, 2017   (JP) .............................. JP2017-022761

(51) Int. Cl.
*C25D 11/00*   (2006.01)
*C25D 11/04*   (2006.01)
(Continued)

(52) U.S. Cl.
CPC ............. *C25D 11/005* (2013.01); *C25D 11/04* (2013.01); *C25D 17/06* (2013.01); *H01G 9/0029* (2013.01);
(Continued)

(58) Field of Classification Search
None
See application file for complete search history.

(56) References Cited

U.S. PATENT DOCUMENTS 3,939,056 A * 2/1976 Fueki ...................... C25D 17/08
204/297.06
4,822,467 A * 4/1989 Young .................. C25D 17/005
204/212
(Continued)

FOREIGN PATENT DOCUMENTS

| JP | 2003-086467 A | 3/2003 |
| JP | 2005-150186 A | 6/2005 |

(Continued)

OTHER PUBLICATIONS

WIPO, International Search Report for for PCT Application No. PCT/JP2017/043999, dated May 12, 2017.
(Continued)

*Primary Examiner* — Louis J Rufo

(57) ABSTRACT

An electrode holder and a method for producing an electrode for an aluminum electrolytic capacitor are provided that enable prevention of exfoliation of a porous layer during chemical formation even when the porous layer is formed on an aluminum electrode so as to have a thickness of 200 micrometers or greater. When an aluminum electrode 10 having at least one surface 11 on which a porous layer 17 having a thickness of 200 micrometers or greater is formed is subjected to chemical formation in a chemical formation solution, the aluminum electrode 10 is held by an electrode holder 50. The electrode holder 50 includes: an insulating
(Continued)

first support plate 51 configured to overlap the one surface 11 of the aluminum electrode 10; an insulating second support plate 52 configured to overlap the other surface 12 of the aluminum electrode 10; and a connecting part 53 configured to connect the first support plate 51 and the second support plate 52 to each other. A portion of the first support plate 51 that overlaps the porous layer 17 while being in contact therewith is formed with a porous member 510.

12 Claims, 4 Drawing Sheets

(51) Int. Cl.
    *C25D 17/06*      (2006.01)
    *H01G 9/00*      (2006.01)
    *H01G 9/045*      (2006.01)
    *H01G 9/052*      (2006.01)
    *H01G 9/055*      (2006.01)
(52) U.S. Cl.
    CPC ............. *H01G 9/045* (2013.01); *H01G 9/055* (2013.01); *H01G 9/0525* (2013.01)

(56) References Cited

U.S. PATENT DOCUMENTS

| | | | | |
|---|---|---|---|---|
| 4,874,567 A | * | 10/1989 | Lopatin | D01D 5/24 264/45.1 |
| 5,316,642 A | * | 5/1994 | Young, Jr. | C25D 17/06 204/198 |
| 5,837,120 A | * | 11/1998 | Forand | C25D 5/611 205/93 |
| 2015/0221443 A1 | | 8/2015 | Katano et al. | |

FOREIGN PATENT DOCUMENTS

| | | |
|---|---|---|
| JP | 2007-123569 A | 5/2007 |
| JP | 2014-57000 A | 3/2014 |
| WO | 2006/100949 A1 | 9/2006 |
| WO | 2009/63532 A1 | 5/2009 |

OTHER PUBLICATIONS

WIPO, Written Opinion for for PCT Application No. PCT/JP2017/043999, dated May 12, 2017.

* cited by examiner

ELECTRODE HOLDER, AND METHOD FOR PRODUCING ELECTRODE FOR ALUMINUM ELECTROLYTIC CAPACITOR

FIELD

The present invention relates to an electrode holder for holding an aluminum electrode during chemical formation and a method for producing an electrode for an aluminum electrolytic capacitor.

BACKGROUND

In a process of producing an aluminum electrolytic capacitor, when an electrode for an anode is produced, anodic oxidation (chemical formation) is performed on an aluminum electrode including a porous layer in a chemical formation solution. Examples of the aluminum electrode include etched foil the surface area of which is increased by etching aluminum foil (see Patent Literatures 1 and 2) and a porous aluminum electrode obtained by forming a sintered layer on a surface of a core material made of aluminum (see Patent Literature 3).

CITATION LIST

Patent Literature

Patent Literature 1: Re-publication of PCT Publication No. WO2006/100949
Patent Literature 2: Re-publication of PCT Publication No. WO2009/63532
Patent Literature 3: Japanese Unexamined Patent Publication No. 2014-57000

SUMMARY

Technical Problem

However, in the aluminum electrodes described in Patent Literatures 1, 2, and 3, when a porous layer such as an etched layer or a sintered layer is formed in a thickness of 200 micrometers or greater, there is the problem that the porous layer tends to exfoliate due to deformation of the porous layer as the chemical formation film grows at the chemical formation step. Particularly when the porous layer has a thickness of 500 micrometers or greater, this exfoliation is more likely to occur.

In view of the above problem, it is an object of the present invention to provide an electrode holder and a method for producing an electrode for an aluminum electrolytic capacitor that enable prevention of exfoliation of a porous layer during chemical formation even when the porous layer is formed in a thickness of 200 micrometers or greater.

Solution to Problem

In order to solve the above problem, the present invention is directed to an electrode holder for holding an aluminum electrode when the aluminum electrode is subjected to chemical formation in a chemical formation solution, the aluminum electrode having at least one surface on which a porous layer having a thickness of 200 micrometers or greater is formed. The electrode holder includes: an insulating first support plate configured to overlap the one surface of the aluminum electrode; an insulating second support plate configured to overlap another surface of the aluminum electrode opposite to the one surface of the aluminum electrode; and a connecting part configured to connect the first support plate and the second support plate to each other. A portion of the first support plate that overlaps the porous layer while being in contact with the porous layer is formed with a porous member.

When the aluminum electrode having the at least one surface on which the porous layer having a thickness of 200 micrometers or greater is formed is subjected to chemical formation, the electrode holder according to the present invention holds the aluminum electrode from both surfaces thereof. Herein, in the electrode holder, the portion of the first support plate that overlaps the porous layer is formed with the porous member, and the chemical formation solution or the like can pass through this porous member. Thus, even when the porous member of the first support plate overlaps the porous layer of the aluminum electrode, the chemical formation can be performed on the porous layer. Furthermore, because the porous member of the first support plate overlaps the porous layer while being in contact therewith, even when the porous layer is about deform as the chemical formation film grows, such deformation is prevented by the porous member of the first support plate. Thus, the porous layer can be prevented from exfoliating during the chemical formation. Consequently, even when the porous layer is formed in a thickness of 200 micrometers or greater, exfoliation of the porous layer during the chemical formation can be prevented.

In the present invention, an embodiment may be provided in which the first support plate and the second support plate are each made of ceramic, or made of metal coated with an insulating film. According to this embodiment, even if the first support plate and the second support plate are formed of inorganic material, undesirable electrode reaction does not occur in the first support plate and the second support plate when power is applied to the aluminum electrode to perform chemical formation thereon. Because the first support plate and the second support plate are formed of inorganic material, treatment with various types of chemical agents or heat treatment, for example, can be performed while the aluminum electrode is being held.

In the present invention, an embodiment may be provided in which the porous layer is formed at a plurality of positions on the aluminum electrode that are separated apart from each other. According to this embodiment, because portions of the aluminum electrode that are used as the electrode for an aluminum electrolytic capacitor, for example, are provided in areas separated apart from each other, even when the porous layer is about to deform as the chemical formation film grows, force of this deformation is distributed. Thus, even when the porous layer is formed in a thickness of 200 micrometers or greater, the exfoliation of the porous layer during the chemical formation can be further prevented.

In the present invention, an embodiment may be provided in which the porous member is provided at a plurality of positions on the first support plate that are separated apart from each other.

In the present invention, an embodiment may be provided in which the porous layer having a thickness of 200 micrometers or greater is formed not only on the one surface of the aluminum electrode but also on the other surface thereof, and a portion of the second support plate that overlaps the porous layer on the other surface while being in contact with the porous layer is formed with a porous member.

In the present invention, an embodiment may be provided in which the thickness of the porous layer is 500 micrometers or greater. According to this embodiment, the porous layer tends to deform as the chemical formation film grows. However, even in such a case, the porous layer can be prevented from exfoliating during the chemical formation if the present invention is applied thereto.

In the present invention, an embodiment may be provided in which a sintered layer made of aluminum powder is deposited as the porous layer on an aluminum core material of the aluminum electrode. This embodiment provides an advantage that the electrostatic capacitance is high, for example, because the surface area thereof is large. In this case, the porous layer tends to deform as the chemical formation film grows due to the large surface area. However, even in such a case, the porous layer can be prevented from exfoliating during the chemical formation if the present invention is applied thereto.

In the present invention, an embodiment may be provided in which a pair of the first support plate and the second support plate is provided in plurality, and these pairs are connected by a connecting member. According to this embodiment, the chemical formation can be performed while a plurality of aluminum electrodes are being held by one electrode holder.

In the present invention, an embodiment may be provided in which the porous member is formed of a sheet-like or plate-like member in which a plurality of through holes are formed.

In the present invention, an embodiment may be provided in which the porous member is formed of a sheet-like or plate-like member formed by a plurality of fibers entangled with each other.

In a method for producing an electrode for an aluminum electrolytic capacitor using the electrode holder according to the present invention, a chemical formation step of performing chemical formation on the aluminum electrode in the chemical formation solution is performed while the aluminum electrode is being held by the electrode holder.

Advantageous Effects of Invention

When the aluminum electrode having the at least one surface on which the porous layer having a thickness of 200 micrometers or greater is formed is subjected to chemical formation, the electrode holder according to the present invention holds the aluminum electrode from both surfaces thereof. Herein, in the electrode holder, the portion of the first support plate that overlaps the porous layer is formed with the porous member, and the chemical formation solution or the like can pass through this porous member. Thus, even when the porous member of the first support plate overlaps the porous layer of the aluminum electrode, the chemical formation can be performed on the porous layer. Furthermore, because the porous member of the first support plate overlaps the porous layer while being in contact therewith, even when the porous layer is about to deform as the chemical formation film grows, such deformation is prevented by the porous member of the first support plate. Thus, the porous layer can be prevented from exfoliating during the chemical formation.

Consequently, even when the porous layer is formed in a thickness of 200 micrometers or greater, exfoliation of the porous layer during the chemical formation can be prevented.

DESCRIPTION OF EMBODIMENTS

Figure 1:
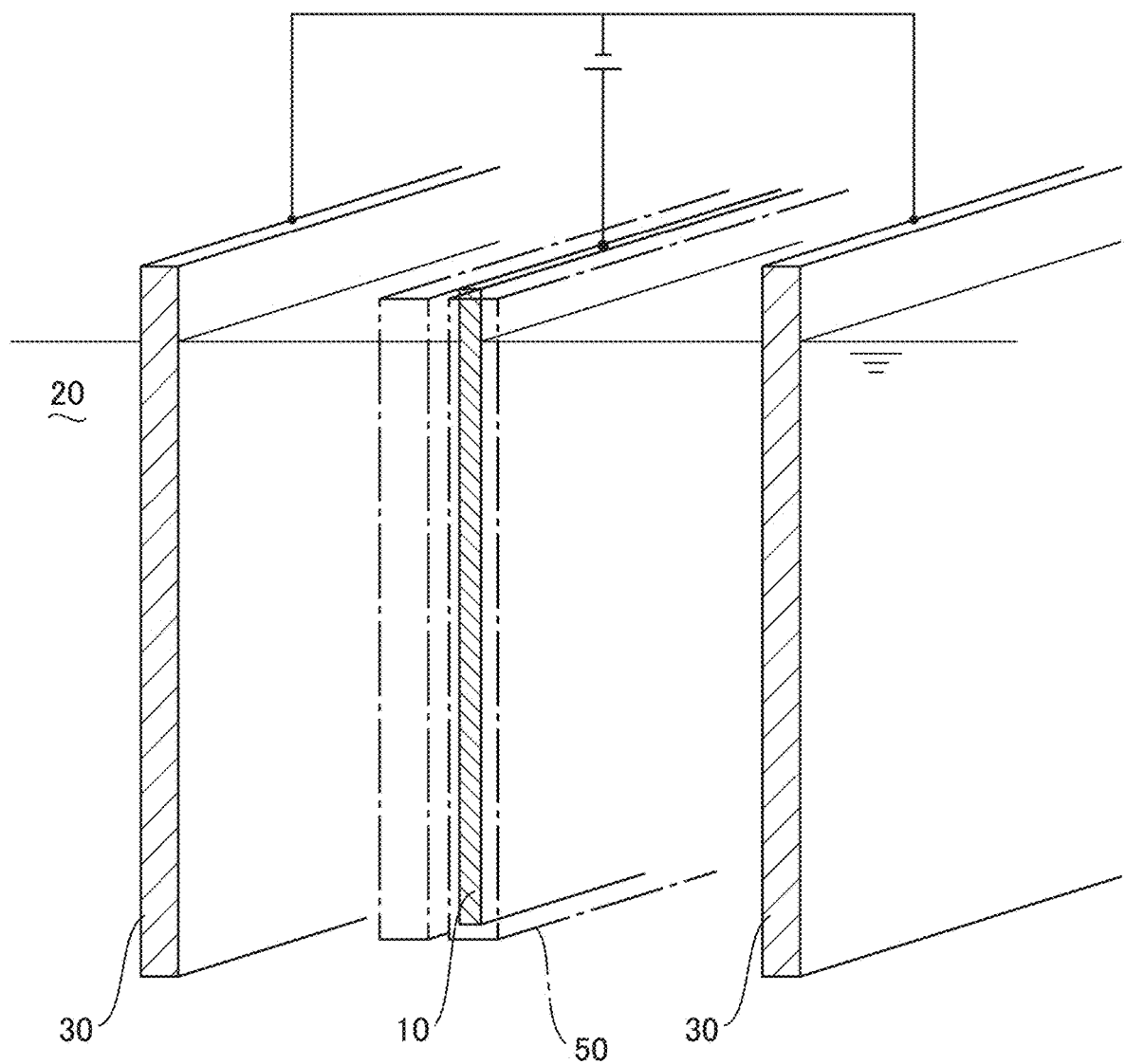
FIG. 1 is an explanatory diagram schematically illustrating a chemical formation step for an electrode for an aluminum electrolytic capacitor to which the present invention is applied.

First Embodiment (Electrode for Aluminum Electrolytic Capacitor)

In the present invention, for producing an electrode for an aluminum electrolytic capacitor, a surface of an aluminum electrode is subjected to chemical formation to produce the electrode for an aluminum electrolytic capacitor. As the aluminum electrode, etched foil formed by etching aluminum foil, a porous aluminum electrode having porous layers that are formed by sintering aluminum powder and are deposited on both surfaces of an aluminum core material, or the like may be used. The etched foil includes, on at least one surface thereof, a porous layer in which tunnel-like pits are formed. The porous aluminum electrode has a porous layer deposited on, for example, at least one surface of an aluminum core material having a thickness of 10 micrometers to 50 micrometers, the porous layer being a layer (sintered layer) formed by sintering aluminum powder. In the porous layer, the aluminum powder is sintered while pores are being retained with each other.

In the aluminum electrode thus configured, the porous layer plays a role of increasing the electrostatic capacitance of the aluminum electrode per material area, and a higher electrostatic capacitance can be obtained when the porous layer is thicker. Thus, the aluminum electrode has such porous layers on both surfaces (one surface and the other surface) thereof. In the present embodiment, the etched foil has, on each surface thereof, a porous layer having a thickness of 200 micrometers or greater, which is, for example, a porous layer (etched layer) having a thickness of 200 micrometers to 500 micrometers. The porous aluminum electrode has, on each surface thereof, a porous layer (sintered layer) having a thickness of 200 micrometers or greater, which is, for example, a porous layer having a thickness of 200 micrometers to 5000 micrometers.

(Constitution of Aluminum Electrolytic Capacitor)

In order to produce an aluminum electrolytic capacitor using the aluminum electrode after chemical formation (the electrode for an aluminum electrolytic capacitor) of the present embodiment, for example, a capacitor element is formed by winding anode foil made of the aluminum electrode after chemical formation (the electrode for an aluminum electrolytic capacitor) and cathode foil with a separator interposed therebetween. Subsequently, the capacitor element is impregnated with an electrolytic solution (a paste). Thereafter, the capacitor element including the electrolytic solution is placed in an outer case, and the case is sealed with a sealing body.

When a solid electrolyte is used instead of the electrolytic solution, a solid electrolyte layer is formed on the surface of the anode foil made of the aluminum electrode after chemical formation (the electrode for an aluminum electrolytic capacitor) and then a cathode layer is formed on the surface of the solid electrolyte layer. Thereafter, the obtained product is sheathed with resin or the like. In this process, an anode terminal to be electrically connected to the anode and a cathode terminal to be electrically connected to the cathode are provided. In this case, a plurality of pieces of anode foil may be laminated.

(Method for Producing Electrode for Aluminum Electrolytic Capacitor)

FIG. 1 is an explanatory diagram schematically illustrating a chemical formation step for the electrode for an aluminum electrolytic capacitor to which the present invention is applied. In the method for producing the electrode for an aluminum electrolytic capacitor of the present embodiment, the chemical formation step of performing chemical formation on an aluminum electrode in a chemical formation solution is performed. In this process, when an electrode for an aluminum electrolytic capacitor for a medium and high voltage is formed by performing the chemical formation at a chemical formation voltage of 200 V or higher, the chemical formation step is performed after a hydration step of bringing the aluminum electrode into contact with pure water having a temperature of 70° C. or higher to form a hydrated film on the aluminum electrode is performed.

At the chemical formation step, as illustrated in FIG. 1, for example, the aluminum electrode 10 is immersed in a chemical formation solution 20 stored in a chemical formation tank (not illustrated). In the chemical formation solution 20, a pair of counter electrodes 30 are disposed, and both surfaces of the aluminum electrode 10 face the respective counter electrodes 30. In this state, chemical formation is performed with the aluminum electrode 10 used as an anode and the counter electrodes 30 used as cathodes, whereby the aluminum electrode 10 is subjected to the chemical formation. Consequently, on both surfaces of the aluminum electrode 10, aluminum oxide (chemical formation films) is formed. At this time, part of the hydrated film formed at the hydration step is dehydrated to become aluminum oxide, and is included in part of the chemical formation film. Herein, the chemical formation tank (not illustrated) may be used as a counter electrode, and in this case, the counter electrodes 30 do not have to be disposed on both sides of the aluminum electrode 10.

At this chemical formation step, as the chemical formation solution 20, for example, an aqueous solution of an organic acid such as adipic acid or a salt thereof is used. For example, in an aqueous solution (organic acid-based chemical formation solution 20) containing an organic acid such as adipic acid or a salt thereof and having a specific resistance of 5 Ωm to 500 Ωm measured at 50° C., the aluminum electrode 10 is subjected to the chemical formation under a condition of a liquid temperature of 40° C. to 90° C. In this process, the power supply voltage applied between the aluminum electrode 10 and each counter electrode 30 is raised until the power supply voltage reaches the final chemical formation voltage, and then the power supply voltage is maintained at the chemical formation voltage.

Instead of the chemical formation solution 20 using an organic acid such as adipic acid or a salt thereof, an aqueous solution containing an inorganic acid such as boric acid or phosphoric acid or a salt thereof may be used as the chemical formation solution 20. For example, in an aqueous solution (inorganic acid-based chemical formation solution 20) containing an inorganic acid such as boric acid or phosphoric acid or a salt thereof and having a specific resistance of 10 Ωm to 1000 Ωm measured at 90° C., the aluminum electrode 10 is subjected to the chemical formation under a condition of a liquid temperature of 40° C. to 95° C.

Alternatively, until the final chemical formation voltage is reached, the chemical formation may be performed in the chemical formation solution 20 using an organic acid such as adipic acid or a salt thereof, and then the chemical formation voltage may be maintained (constant-voltage chemical formation) in the chemical formation solution 20 using an inorganic acid such as boric acid or phosphoric acid or a salt thereof.

When either of these chemical formation solutions 20 is used, in the course of the chemical formation step, depolarization treatment such as thermal depolarization treatment of heating the aluminum electrode 10 and in-liquid depolarization treatment of immersing the aluminum electrode 10 in an aqueous solution containing phosphate ions, for example, is performed. In the thermal depolarization treatment, for example, the treatment temperature is 450° C. to 550° C., and the treatment time is 2 minutes to 10 minutes. In the in-liquid depolarization treatment, the aluminum electrode 10 is immersed in an aqueous solution of 20 mass % to 30 mass % phosphoric acid for 5 minutes to 15 minutes depending on the film withstand voltage under a condition of a liquid temperature of 60° C. to 70° C. In the depolarization treatment, no voltage is applied to the aluminum electrode 10. In the course of voltage rise of the power supply voltage to the chemical formation voltage, a phosphoric acid immersion step of immersing the aluminum electrode 10 in an aqueous solution containing phosphate ions may be performed. At this phosphoric acid immersion step, the aluminum electrode 10 is immersed in a phosphoric acid aqueous solution having a liquid temperature of 40° C. to 80° C. and having a specific resistance of 0.1 Ωm to 5 Ωm measured at 60° C. for a period of 3 minutes to 30 minutes. By this phosphoric acid immersion step, aluminum hydroxide precipitated at the chemical formation step can be efficiently removed, and the subsequent generation of aluminum hydroxide can be reduced. In addition, phosphate ions can be taken into the chemical formation film by the phosphoric acid immersion step, and thus the stability of the chemical formation film such as being able to improve durability for immersion in boiling water or acidic solution can be effectively improved.

(Constitution of Electrode Holder 50)

Figure 2:
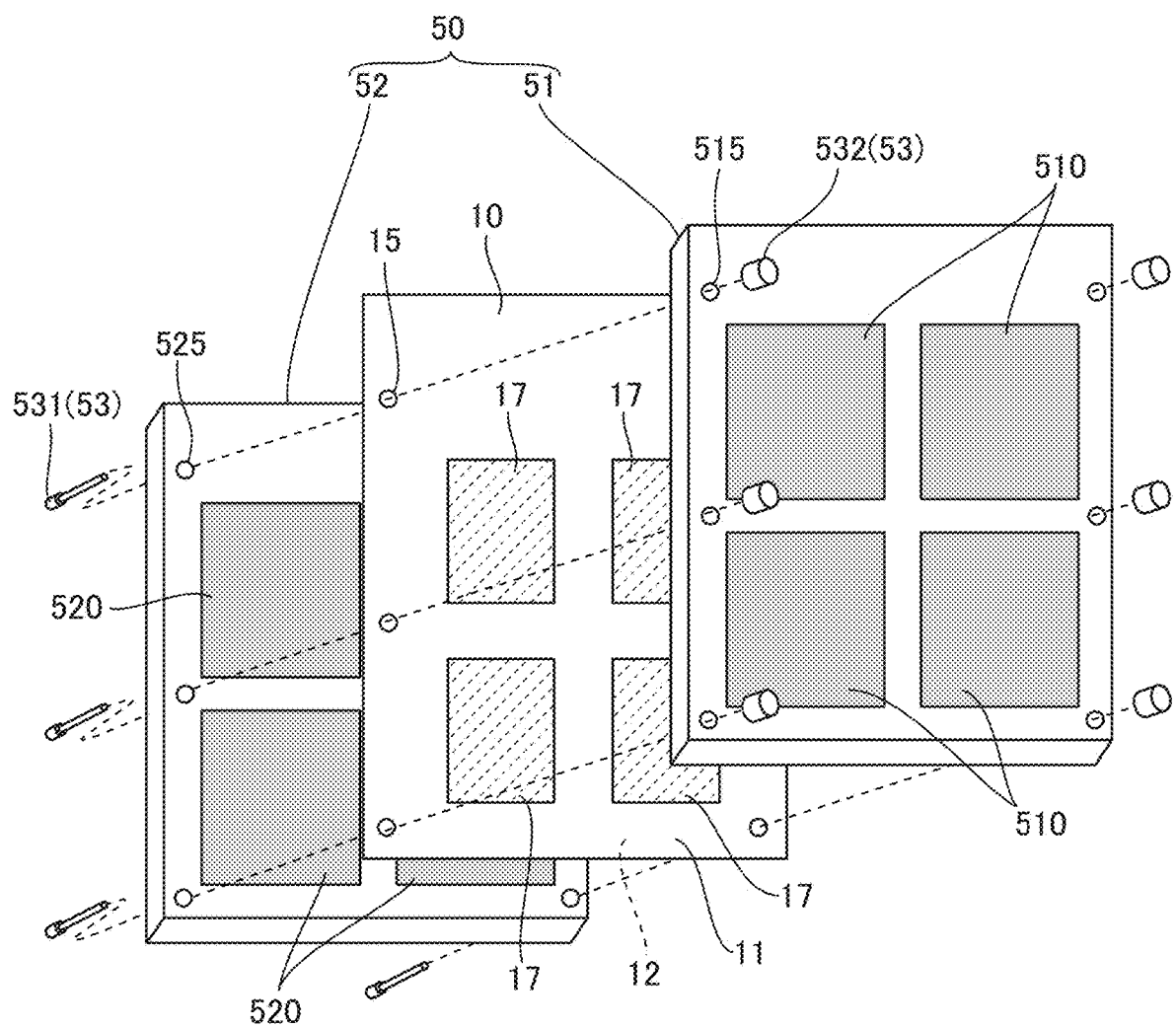
FIG. 2 is an explanatory diagram of an electrode holder according to a first embodiment of the present invention.

FIG. 2 is an explanatory diagram illustrating an electrode holder 50 according to the first embodiment of the present invention, illustrating a state in which the electrode holder 50 is disassembled into a first support plate 51, a second support plate 52, and a connecting part 53.

As illustrated in FIG. 1, in the present embodiment, when the chemical formation step is performed, the aluminum electrode 10 on which porous layers 17 are formed is held by the electrode holder 50, and the aluminum electrode 10 is immersed together with the electrode holder 50 into the chemical formation solution 20.

As illustrated in FIG. 2, the electrode holder 50 includes an insulating first support plate 51 configured to overlap one surface 11 of the aluminum electrode 10, an insulating second support plate 52 configured to overlap another surface 12 of the aluminum electrode 10 opposite to the one surface 11 thereof, and a connecting part 53 configured to connect the first support plate 51 and the second support plate to each other. In the present embodiment, in end portions of the first support plate 51, the aluminum electrode 10, and the second support plate 52, a plurality of holes 515, 15, and 525 are formed. The connecting part 53 includes: bolts 531 to be inserted into holes 515 of the first support plate 51, the holes 15 of the aluminum electrode 10, and the holes 525 of the second support plate 52; and nuts 532 to be threaded onto the corresponding bolts 531.

Herein, on the one surface 11 and the other surface 12 of the aluminum electrode 10, the porous layers 17 are formed.

By contrast, porous members 510 each of which overlaps the corresponding porous layer 17 on the one surface 11 while being in contact therewith are formed on the first support plate 51 of the electrode holder 50, and porous members 520 each of which overlaps the corresponding porous layer 17 on the other surface 12 while being in contact therewith are formed on the second support plate 52 of the electrode holder 50.

In the present embodiment, on each of the one surface 11 and the other surface 12 of the aluminum electrode 10, the porous layers 17 are formed at a plurality of positions thereof that are separated apart from each other. Each porous layer 17 on the one surface 11 and the corresponding porous layer 17 on the other surface 12 overlap with the aluminum electrode 10 interposed therebetween. In the present embodiment, on each of the one surface 11 and the other surface 12 of the aluminum electrode 10, the porous layers 17 are formed at four positions in total that are vertically separated apart and laterally separated apart from each other.

In a manner corresponding to this constitution, on the first support plate 51 of the electrode holder 50, the porous members 510 are formed at four positions in total that are vertically separated apart and laterally separated apart from each other. The porous members 510 overlap the corresponding porous layers 17 formed on the one surface 11 of the aluminum electrode 10 while being in contact therewith in a one-to-one relation. Furthermore, on the second support plate 52 of the electrode holder 50, the porous members 510 are formed at four positions in total that are vertically separated apart and laterally separated apart from each other. The porous members 510 overlap the corresponding porous layers 17 formed on the other surface 12 of the aluminum electrode 10 while being in contact therewith in a one-to-one relation. Herein, the area of each of the porous members 510 and 520 is larger than that of the corresponding porous layer 17. Thus, each of the porous members 510 and 520 overlaps the corresponding porous layer 17 and an area surrounding the porous layer 17.

In the present embodiment, the porous members 510 and 520 are each formed of a sheet-like or plate-like member in which a plurality of through holes are formed. Alternatively, the porous members 510 and 520 are each formed of a sheet-like or plate-like member formed by a plurality of fibers entangled with each other, and in this member, many cavities exist in a manner communicating with each other. Thus, the chemical formation solution and bubbles, for example, can pass through the porous members 510 and 520.

In the present embodiment, the first support plate 51 and the second support plate 52 are each formed of insulating resin material or insulating inorganic material. In the present embodiment, the first support plate 51 and the second support plate 52 are each formed of insulating inorganic material. For example, the first support plate 51 and the second support plate 52 are each made of ceramic, or made of metal coated with an insulating film. In like manner with the first support plate 51 and the second support plate 52, the connecting part 53 (each of the bolts 531 and the nuts 532) is formed of insulating inorganic material. For example, the connecting part 53 (each of the bolts 531 and the nuts 532) is made of ceramic, or made of metal coated with an insulating film. Thus, the whole of the electrode holder 50 is formed of inorganic material. Consequently, the chemical formation step can be performed while the aluminum electrode 10 is being held by the electrode holder 50, and also thermal treatment such as thermal depolarization treatment or chemical immersion treatment such as in-liquid depolarization treatment can be performed while the aluminum electrode 10 is being held by the electrode holder 50.

When the first support plate 51 and the second support plate 52 are each made of metal coated with an insulating film, an embodiment may be provided in which, for example, the surface of a plate-like member made of valve metal such as aluminum is coated with an insulating film such as an anodic oxide film.

(Main Effects of the Present Embodiment)

As described in the foregoing, when the aluminum electrode 10 on which the porous layers 17 each having a thickness of 200 micrometers or greater are formed is subjected to chemical formation, the electrode holder 50 of the present embodiment holds the aluminum electrode 10 from both surfaces thereof. Herein, in the electrode holder 50, portions of the first support plate 51 and the second support plate 52 that overlap the porous layers 17 are formed with the porous members 510 and 520, and the chemical formation solution or the like can pass through the porous members 510 and 520. Thus, even when the porous members 510 and 520 overlap the porous layers 17 of the aluminum electrode 10, the chemical formation can be performed on the porous layers 17. Furthermore, because the porous members 510 and 520 of the first support plate 51 and the second support plate 52 overlap the corresponding porous layers 17 while being in contact therewith, even when the porous layers 17 are about to deform as the chemical formation films grow, such deformation is prevented by the porous members 510 and 520. Thus, the porous layers 17 can be prevented from exfoliating during the chemical formation. Consequently, even when the porous layers 17 are each formed in a thickness of 200 micrometers or greater, exfoliation of the porous layers 17 during the chemical formation can be prevented.

The first support plate 51 and the second support plate 52 are each made of ceramic, or made of metal coated with an insulating film, for example, and thus the whole of the electrode holder 50 is formed of insulating inorganic material. Thus, when power is applied to the aluminum electrode 10 to perform chemical formation thereon, undesirable electrode reaction does not occur in the first support plate 51 and the second support plate 52. Because the whole of the electrode holder 50 is formed of insulating inorganic material, treatment with various types of chemical agents or heat treatment, for example, can be performed while the aluminum electrode 10 is being held by the electrode holder 50.

Because the porous layers 17 are formed at a plurality of positions on the aluminum electrode 10 that are separated apart from each other, even when the porous layers 17 are about to deform as the chemical formation films grow, force of this deformation is distributed. Thus, even when the porous layers are each formed in a thickness of 200 micrometers or greater, the exfoliation of the porous layers 17 during the chemical formation can be further prevented.

When the thickness of each porous layer 17 is 500 micrometers or greater, the porous layers 17 tend to deform as the chemical formation films grow. However, even in such a case, the porous layers can be prevented from exfoliating during the chemical formation by the present embodiment. When each porous layer 17 is a sintered layer made of aluminum powder, an advantage that the electrostatic capacitance is high, for example, can be obtained because the surface area thereof is large. On the other hand, the porous layer 17 tends to deform as the chemical formation film grows due to the large surface area. However, even in such a case, the porous layers 17 can be prevented from exfoliating during the chemical formation by the present embodiment.

Second Embodiment

Figure 3:
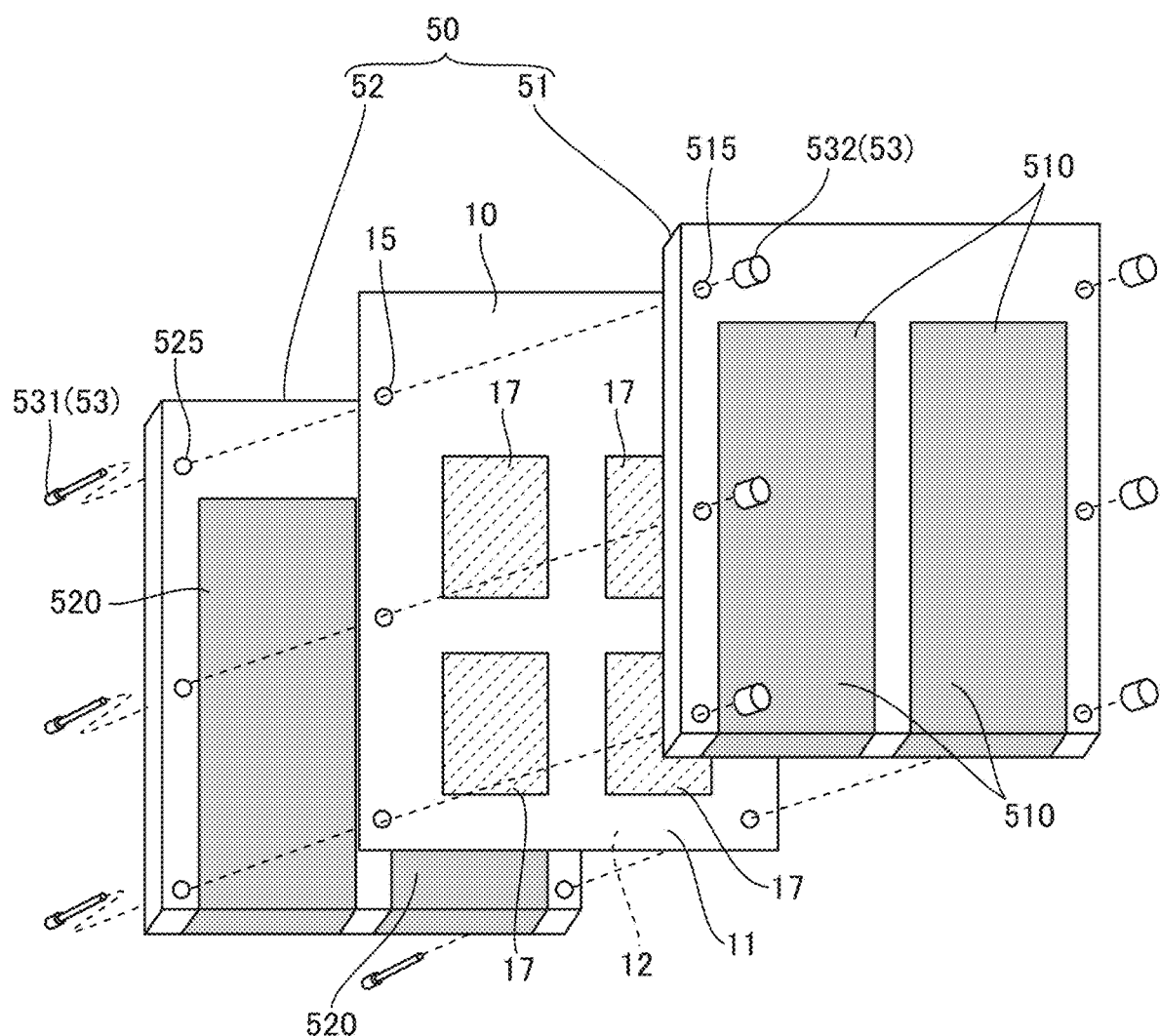
FIG. 3 is an explanatory diagram of an electrode holder according to a second embodiment of the present invention.

FIG. 3 is an explanatory diagram illustrating an electrode holder 50 according to a second embodiment of the present invention, illustrating a state in which the electrode holder 50 is disassembled into a first support plate 51, a second support plate 52, and a connecting part 53. Herein, the basic constitution of the present embodiment is the same as that of the first embodiment, and thus like elements are designated by like reference signs, and detailed description thereof is omitted.

In the present embodiment also, in the same manner as in the first embodiment, the aluminum electrode 10 on which the porous layers 17 are formed is held by the electrode holder 50 illustrated in FIG. 3 when the chemical formation step is performed. In the present embodiment also, in the same manner as in the first embodiment, on each of the one surface 11 and the other surface 12 of the aluminum electrode 10, the porous layers 17 are formed at a plurality of positions thereof that are separated apart from each other. Each porous layer 17 on the one surface 11 and the corresponding porous layer 17 on the other surface 12 overlap with the aluminum electrode 10 interposed therebetween. In the present embodiment, on each of the one surface 11 and the other surface 12 of the aluminum electrode 10, the porous layers 17 are formed at four positions in total that are vertically separated apart and laterally separated apart from each other.

In a manner corresponding to this constitution, on the first support plate 51 of the electrode holder 50, the porous members 510 are formed at two positions that are laterally separated apart from each other. The porous members 510 each overlap two porous layers 17 that are vertically aligned among the four porous layers 17 formed on the one surface 11 of the aluminum electrode 10, while being in contact therewith. In the present embodiment also, in the same manner as in the first embodiment, the whole of the electrode holder 50 is formed of inorganic material.

In this constitution also, even when the porous layers 17 are about to deform as the chemical formation films grow, such deformation is prevented by the porous members 510 and 520. Thus, the porous layers 17 can be prevented from exfoliating during the chemical formation. Consequently, even when the porous layers 17 are each formed in a thickness of 200 micrometers or greater, exfoliation of the porous layers 17 during the chemical formation can be prevented.

Third Embodiment

Figure 4:
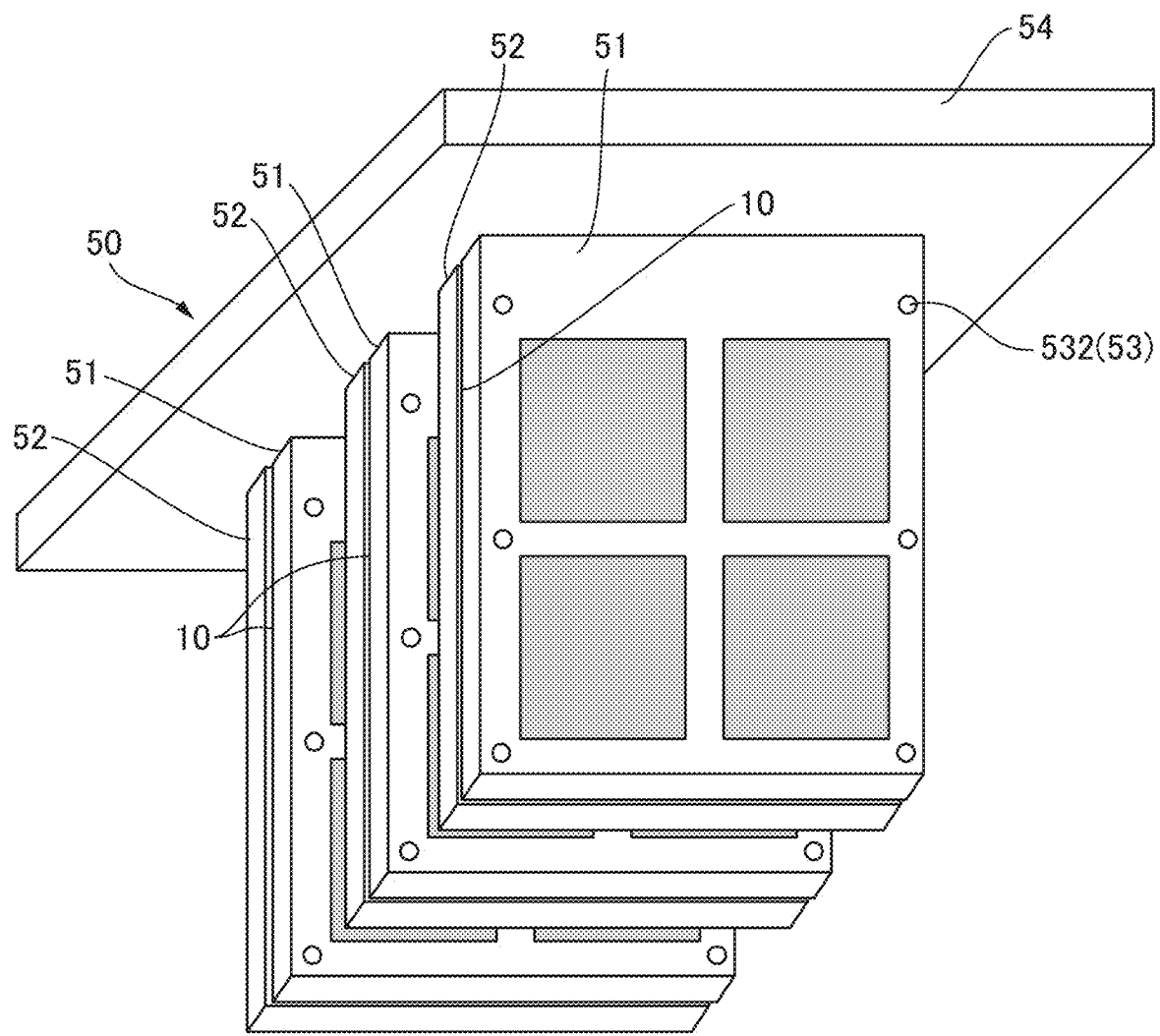
FIG. 4 is an explanatory diagram of an electrode holder according to a third embodiment of the present invention.

FIG. 4 is an explanatory diagram of an electrode holder 50 according to a third embodiment of the present invention. Herein, the basic constitution of the present embodiment is the same as that of the first embodiment, and thus like elements are designated by like reference signs, and detailed description thereof is omitted.

As illustrated in FIG. 4, in the electrode holder 50 of the present embodiment, a pair of the first support plate 51 and the second support plate 52 described with reference to FIG. 2, for example, is provided in plurality, and these pairs are connected by a connecting member 54. Thus, a plurality of aluminum electrodes 10 can be held by this single electrode holder 50. In this case, a constitution may be used in which the counter electrodes 30 illustrated in FIG. 1 are disposed on both sides of each aluminum electrode 10. Alternatively, the chemical formation tank (not illustrated) storing the chemical formation solution 20 (see FIG. 1) may be used as a counter electrode, and in this case, the counter electrodes 30 do not have to be disposed on both sides of the aluminum electrode 10.

In the present embodiment, the upper ends of the first support plates 51 and the upper ends of the second support plates 52 are connected to the connecting member 54 having a plate-like shape. In the connecting member 54, an opening or a conducting portion for supplying power to the aluminum electrodes 10 is formed.

In the present embodiment, the whole of the electrode holder 50 including the first support plates 51, the second support plates 52, the connecting parts 53, and the connecting member 54 is formed of inorganic material. Thus, the chemical formation step can be performed while the aluminum electrodes 10 are being held by the electrode holder 50, and thermal treatment such as thermal depolarization treatment or chemical immersion treatment such as in-liquid depolarization treatment can be performed while the aluminum electrodes 10 are being held by the electrode holder 50.

Herein, the connecting member 54 is not immersed in the chemical formation solution, and thus may be conductive. In this case, an embodiment may be provided in which power is supplied to the aluminum electrode 10 through the connecting member 54.

Other Embodiments

In the above embodiments, the connecting part 53 of the electrode holder 50 includes the bolts 531 and the nuts 532. However, the connecting part 53 may be configured to connect the first support plate 51 and the second support plate 52 to each other with a hook, for example. In the above embodiments, the connecting part 53 (the bolts 531 and the nuts 532) is made of ceramic, or made of metal coated with an insulating film. However, the connecting part 53 may be conductive if the first support plate 51 and the second support plate 52 are insulated.

In the above embodiments, when the aluminum electrode 10 for producing an electrode for an aluminum electrolytic capacitor is subjected to chemical formation, the electrode holder 50 is used. However, the present invention may be applied to the electrode holder 50 to be used at a chemical formation step when the aluminum electrode 10 is used, for example, to support a catalyst or the like.

In the above embodiments, a case has been described in which the porous layers 17 are formed on both surfaces (the one surface 11 and the other surface 12) of the aluminum electrode 10. However, the present invention may be applied to a case in which the porous layers 17 are formed only on the one surface 11 of the aluminum electrode 10. In this case, the porous members 510 may be provided only on the first support plate 51 of the electrode holder 50.

REFERENCE SIGNS LIST

10 . . . aluminum electrode, 11 . . . one surface, 12 . . . other surface, 17 . . . porous layer, 20 . . . chemical formation solution, 30 . . . counter electrode, 50 . . . electrode holder, 51 . . . first support plate, 52 . . . second support plate, 53 . . . connecting part, 54 . . . connecting member, 510, 520 . . . porous member

The invention claimed is:

1. An electrode holder for holding an aluminum electrode having at least one surface on which a porous layer having a thickness of 200 micrometers or greater is formed, in a chemical formation solution, the electrode holder comprising:
   an insulating first support plate, which is in contact with the one surface of the aluminum electrode when the aluminum electrode is held by the electrode holder;
   an insulating second support plate, which is in contact with another surface of the aluminum electrode opposite to the one surface of the aluminum electrode, when the aluminum electrode is held by the electrode holder; and
   a connecting part configured to connect the first support plate and the second support plate to each other,
   wherein a portion of the first support plate, which is in contact with the porous layer of the aluminum electrode when the aluminum electrode is held by the electrode holder, is formed with a porous member.

2. The electrode holder according to claim 1, wherein the first support plate the second support plate, and the connecting part are each formed of inorganic material.

3. The electrode holder according to claim 2, wherein the first support plate and the second support plate are each formed of ceramic, or formed of metal coated with an insulating film.

4. The electrode holder according to claim 1, wherein the porous layer is formed at a plurality of positions on the aluminum electrode that are separated apart from each other.

5. The electrode holder according to claim 4, wherein the porous member is provided at a plurality of positions on the first support plate that are separated apart from each other.

6. The electrode holder according to claim 1, wherein the porous layer having a thickness of 200 micrometers or greater is formed not only on the one surface of the aluminum electrode but also on the other surface thereof, and a portion of the second support plate that overlaps the porous layer on the other surface while being in contact with the porous layer is formed with a porous member.

7. The electrode holder according to claim 1, wherein the thickness of the porous layer is 500 micrometers or greater.

8. The electrode holder according to claim 1, wherein a sintered layer made of aluminum powder is deposited as the porous layer on an aluminum core material of the aluminum electrode.

9. The electrode holder according to claim 1, wherein pairs of the first support plate and the second support plate are provided, and the pairs are connected together by a connecting member.

10. The electrode holder according to claim 1, wherein the porous member is formed of a sheet-like or plate-like member in which a plurality of through holes are formed.

11. The electrode holder according to claim 1, wherein the porous member is formed of a sheet-like or plate-like member formed by a plurality of fibers entangled with each other.

12. A method for producing an electrode for an aluminum electrolytic capacitor using the electrode holder as claimed in claim 1, wherein a chemical formation step of performing anodic oxidation on the aluminum electrode in the chemical formation solution is performed while the aluminum electrode is being held by the electrode holder.

* * * * *